(12) United States Patent
Kim

(10) Patent No.: US 6,366,790 B1
(45) Date of Patent: Apr. 2, 2002

(54) MULTI-SECTORIZED BASE TRANSCEIVER STATION SYSTEM

(75) Inventor: Heon-gyu Kim, Sungnam (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/338,787

(22) Filed: Jun. 23, 1999

(30) Foreign Application Priority Data

Jun. 23, 1998 (KR) ............................................. 98-23624

(51) Int. Cl.$^7$ ................................................. H04B 1/38
(52) U.S. Cl. ........................ 455/562; 455/25; 343/879
(58) Field of Search ........................ 455/561, 25, 13.3, 455/19, 403, 562, 433, 443, 446; 343/706, 757, 758, 878, 879

(56) References Cited

U.S. PATENT DOCUMENTS

| | | | |
|---|---|---|---|
| 4,223,310 A | * 9/1980 | Davidson et al. | ............ 343/100 |
| 5,187,806 A | 2/1993 | Johnson et al. | |
| 5,428,818 A | 6/1995 | Meidan et al. | |
| 5,535,423 A | 7/1996 | Dupuy | |
| 5,740,526 A | * 4/1998 | Bonta et al. | ............. 455/277.2 |
| 5,771,449 A | 6/1998 | Blasing et al. | |
| 5,774,790 A | 6/1998 | Dupuy | |
| 5,936,580 A | * 8/1999 | Van Puijenbroek | ......... 343/700 |
| 5,969,689 A | * 10/1999 | Martek et al. | ............... 343/758 |
| 6,151,310 A | * 11/2000 | Dent | ........................... 370/330 |
| 6,161,013 A | * 12/2000 | Anderson et al. | ............ 455/435 |
| 6,161,018 A | * 12/2000 | Reed et al. | ................ 455/456 |
| 6,161,024 A | * 12/2000 | Komara | ...................... 455/562 |

* cited by examiner

*Primary Examiner*—William Trost
*Assistant Examiner*—Congvan Tran
(74) *Attorney, Agent, or Firm*—Dilworth & Barrese, LLP

(57) ABSTRACT

A multi-sectorized base transceiver station system for increasing system capacity in a mobile communication system is provided by sectorizing base transceiver stations covering a particular coverage area within a cell. The multi-sectorized base transceiver station system includes a first base transceiver station having a first narrow beam directional antenna, a second narrow beam directional antenna, and a third narrow beam directional antenna, where the first, second, and third antennas are separated by 60° with respect to each other; and a second base transceiver station having a fourth narrow beam directional antenna, a fifth narrow beam directional antenna, and a sixth narrow beam directional antenna, where the fourth, fifth, and sixth antennas are separated by 60° with respect to each other. The first base transceiver station and the second base transceiver station are separated by 180° with respect to each other.

18 Claims, 5 Drawing Sheets

MULTI-SECTORIZED BASE TRANSCEIVER STATION SYSTEM

PRIORITY

This application claims priority to an application entitled "Multi-Sectorized Base Transceiver Station System" filed in the Korean Industrial Property Office on Jun. 23, 1998 and assigned Ser. No. 98-23624, the contents of which are incorporated herein by reference.

BACKGROUND OF THE INVENTION

1. Field of the Invention

The present invention relates generally to mobile communication systems and in particular, to a multi-sectorized base transceiver station system in a mobile communication system.

2. Description of the Related Art

A cellular mobile telecommunication system includes a plurality of base transceiver stations (BTSs) for providing mobile communication services to mobile stations that move within a specific area of cell; and a mobile switching center (MSC) connecting the BTSs to a public switched telephone network (PSTN).

The cellular mobile telecommunication system includes technology which enables many subscribers to use the mobile communication services simultaneously by efficiently improving and managing the use of various frequencies among the subscribers. The technology which enables the efficient use of frequencies is primarily cell division technology and sectorization is a main cell division technology. Sectorization entails dividing a sector cell into three equal parts by separating three antennas by 120° right and left. The mobile station associates a sector antenna as a BTS.

U.S. Pat. No. 5,428,818 entitled "Method and Apparatus For Reducing Interference In A Radio Communication Link of A Cellular Communication System" discloses a technology for serving different service areas (sectors by adjusting the sector antenna of a central communication base site).

FIG. 1a illustrates the structure of a three-sector BTS and FIG. 1b illustrates the service coverage area according to prior art cell-division technology. As illustrated, a first antenna 110 serving sector α 115, a second antenna 120 serving sector β 125, and a third antenna 130 serving sector γ 135. The antennas 110, 120, 130 are 120° directional antennas separated by 120° with respect to each other.

When dividing a cell into sectors using the directional BTS antenna as illustrated by FIGS. 1a and 1b, each antenna supports one-third of the cell, thereby reducing interference by one-third. Accordingly, the total system capacity is increased approximately three times. However, considering the side lobes produced by an electromagnetic wave emitted by an antenna, the efficiency is about 85%, thereby increasing system capacity by approximately 2.55 times.

As stated above, cell division is a method for increasing system capacity by providing coverage areas within a cell where the number of subscribers can be greater than the number of subscribers within the same coverage area without sectorization and with a high level of service quality. However, when available frequency assignments are all being used or the number of subscribers is highly increased, it is possible that the three sectors cannot accommodate all subscribers.

In an effort to solve this problem, if the cell is expanded, a service coverage of the cell decreases and mutual interference tends to increase. Accordingly, it is then necessary to improve system optimization again by further sectorizing the cell by adding additional BTSs and antennas to improve system performance. If this is done, additional costs are realized in system maintenance, such as in renting additional building space for fixing additional mobile communication equipment to the mobile communication system and in purchasing additional BTSs. Therefore, the conventional sectorization technologies cannot increase the number of sectors for increasing system capacity in a mobile communication system without adding additional mobile communication equipment to the mobile communication system.

SUMMARY OF THE INVENTION

To solve the problems associated with prior art sectorization technologies, the present invention provides a multi-sectorized base transceiver station system capable of increasing the total number of subscribers which can be simultaneously accommodated in a cell and reducing or foregoing any additional expenses involved in further sub-dividing the cell.

According to a first preferred embodiment of the present invention, a multi-sectorized base transceiver station system for increasing system capacity in a mobile communication system by sectorizing base transceiver stations covering a particular coverage area within a cell. The multi-sectorized base transceiver station system includes a first base transceiver station having a first narrow beam directional antenna, a second narrow beam directional antenna, and a third narrow beam directional antenna, where the first, second, and third antennas are separated by 60° with respect to each other; and a second base transceiver station having a fourth narrow beam directional antenna, a fifth narrow beam directional antenna, and a sixth narrow beam directional antenna, where the fourth, fifth, and sixth antennas are separated by 60° with respect to each other. The first base transceiver station and the second base transceiver station are separated by 180° with respect to each other.

The first antenna to the sixth antenna have a beamwidth of 45° to 60°. The first antenna and the second antenna have structure of a base transceiver station for an omni-cell, and in particular, for a three-sector cell. The first base transceiver station and the second base transceiver station are located at a site using a single antenna pole for both base transceiver stations.

A second preferred embodiment of the present invention provides a multi-sectorized base transceiver station system for increasing system capacity in a mobile communication system by sectorizing base transceiver stations covering a particular coverage area within a cell. The multi-sectorized base transceiver station includes a first base transceiver station having a first narrow beam directional antenna, a second narrow beam directional antenna, and a third narrow beam directional antenna, where the first, second, and third antennas are separated by 120° with respect to each other; and a second base transceiver station having a fourth narrow beam directional antenna, a fifth narrow beam directional antenna, and a sixth narrow beam directional antenna, where the fourth, fifth, and sixth antennas are separated by 120° with respect to each other. The first base transceiver station and the second base transceiver station are separated by 60° with respect to each other.

The first antenna to the sixth antenna have a beamwidth of 45° to 60°. The first antenna and the second antenna have a structure of a base transceiver station for an omni-cell and in particular, for a three-sector cell. The first base transceiver station and the second base transceiver station are located at a site using a single antenna pole for both base transceiver stations.

A third preferred embodiment of the present invention, provides a multi-sectorized base transceiver station system for increasing system capacity in a mobile communication system by sectorizing base transceiver stations covering a particular coverage area within a cell. The multi-sectorized base transceiver station includes a first base transceiver station having a first narrow beam directional antenna, a second narrow beam directional antenna, and a third narrow beam directional antenna, where the first, second, and third antennas are separated by 120° with respect to each other; and a second base transceiver station having a fourth narrow beam directional antenna, a fifth narrow beam directional antenna, and a sixth narrow beam directional antenna, where the fourth, fifth, and sixth antennas are separated by 120° with respect to each other. The first and second base transceiver stations are located on a site by equalizing a direction of propagation of the antennas of the first and second base transceiver stations. The first and second base transceiver stations are configured to have a different area of coverage with respect to each other.

The fourth antenna to the sixth antenna are lower along a vertical axis with respect to the first antenna to the third antenna, or the fourth antenna to the sixth antenna having a greater tilt than the first antenna to the third antenna such that the area of coverage of the first base transceiver station is greater or wider than the area of coverage of the second base transceiver station. The first antenna to the sixth antenna have a beamwidth of 95° to 120°, and the first base transceiver station serves a long distance area of the particular coverage area and the second base transceiver station serves a short distance area of the particular coverage area. The first base transceiver station and the second base transceiver station are located at a site using a single antenna pole for both base transceiver stations. The first antenna and the second antenna have a structure of a base transceiver station for an omni-cell and in particular, for a three-sector cell.

BRIEF DESCRIPTION OF THE DRAWINGS

FIG. 1b is a diagram illustrating the service coverage area of the prior art three-sector base transceiver station of FIG. 1a;

FIG. 2b is a diagram illustrating the service coverage area of the apparatus of FIG. 2a;

FIG. 3b is a diagram illustrating the service coverage area of the apparatus of FIG. 3a;

FIG. 4b is a diagram illustrating the service coverage area of the apparatus of FIG. 4a.

DESCRIPTION OF THE PREFERRED EMBODIMENTS

The present invention multi-sectorizes a cell of a mobile communication system, preferably a code division multiple access (CDMA) mobile communication system, using a plurality of 45° or 60° narrow beam antennas instead of the existing 120° or 95° antennas for a three-sector cell. That is, the present invention provides methods for sectorizing or dividing a cell by using the existing sectorized base transceiver station (BTS).

According to a first preferred embodiment of a multi-sectorizing apparatus for a cell in connection with the present invention, two BTSs for three sectors having 90° to 120° narrow beam antennas are located at the same location or site, i.e., located at the same antenna pole of the same building, etc., and the antennas are exchanged to 60° (or 45° antennas). Further, the antennas are separated by 60° with respect to each other, thereby each BTS can serve a cell coverage area spanning 180°. The two BTSs are separated by 180° with respect to each other. Accordingly, the total service coverage area of the cell being serviced by the two BTSs is divided into six sectors, where one sector has a fan-shaped shape where the two BTSs are end points.

According to a second preferred embodiment of a multi-sectorizing apparatus for a cell in connection with the present invention, two BTSs for three sectors having 45° to 60° narrow beam antennas are located at the same location or site. The antennas are separated by 120° with respect to each other. The two BTSs are separated by 60° with respect to each other. Accordingly, the total service coverage area of the cell being serviced by the two BTSs is divided into six sectors, where one sector has a fan-shaped shape where the two BTSs are end points.

According to a third preferred embodiment of a multi-sectorizing apparatus for a cell in connection with the present invention, two conventional BTSs for three sectors using 120° antennas are located on the same location or site. The total service coverage area is divided into an internal service region and an external service region by adjusting the angle of tilt of each antenna. Accordingly, the total service coverage area serviced by the two BTSs is divided into six sectors, i.e., three internal sectors and three external sectors.

Figure 2A:
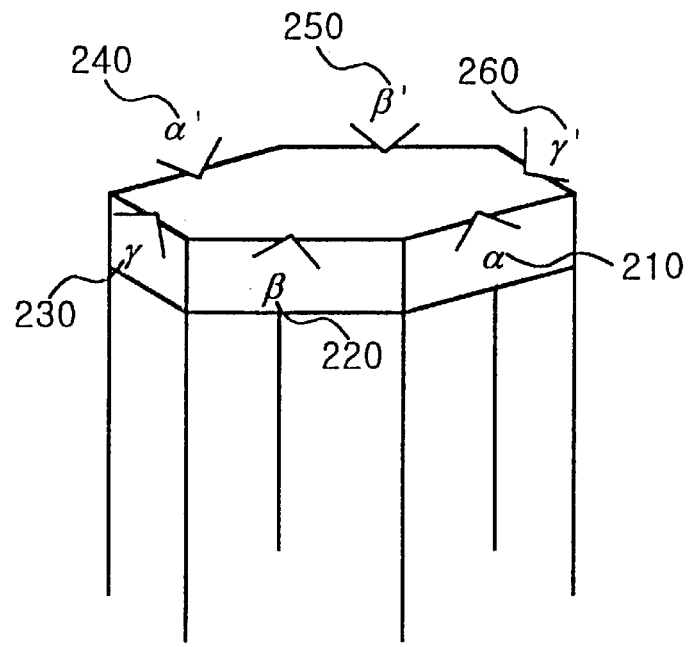
FIG. 2a is a diagram illustrating a first embodiment of an apparatus for multi-sectorizing a cell according to the present invention.
Figure 2B:
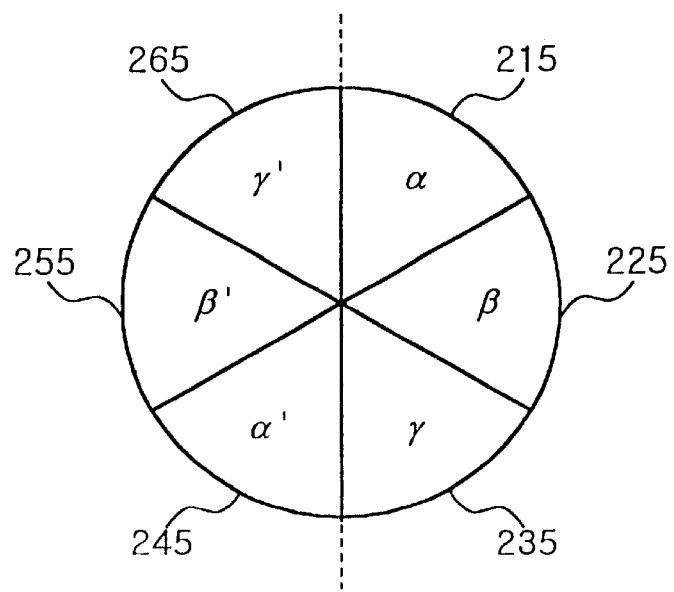

A description will now be provided as to the operation of the three above-mentioned preferred embodiments. FIG. 2a shows the first preferred embodiment of the apparatus for multi-sectorizing a cell according to the present invention; and FIG. 2b shows the corresponding service coverage area. As illustrated, the apparatus includes a first BTS having a first antenna 210, a second antenna 220, and a third antenna 230, and a second BTS having a fourth antenna 240, a fifth antenna 250, and a sixth antenna 260.

The first antenna 210 serves sector α 215, the second antenna 220 serves sector β 225, and the third antenna 230 serves sector γ 235. The fourth antenna 240 serves sector α' 245, the fifth antenna 250 serves sector β' 255, and the sixth antenna 260 serves sector γ' 265. The antennas 210, 220, 230, 240, 250, 260 are 45° to 60° directional antennas and they are separated by 60° with respect to each other.

Therefore, the first BTS has the first antenna 210, the second antenna 220, and the third antenna 230 to serve sector α 215, sector β 225, and sector γ 235. The second BTS has the fourth antenna 240, the fifth antenna 250, and the sixth antenna 260 to serve sector α' 245, the sector β' 255, and sector γ' 265. A range that a BTS can serve is from 0 to 180° and the handoff between sectors, i.e., a soft handoff, occurs within this range.

Additionally, soft handoff occurs at the borders of the first and second BTSs as a border of sector α 215 and sector γ' 265 and a border of sector α' 245 and sector γ 235.

Figure 3A:
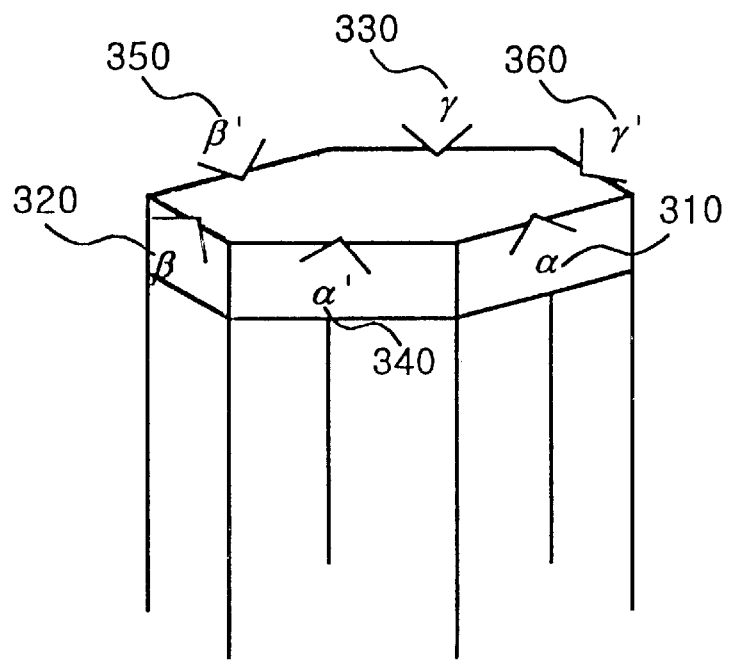
FIG. 3a is a diagram illustrating a second embodiment of an apparatus for multi-sectorizing a cell according to the present invention.
Figure 3B:
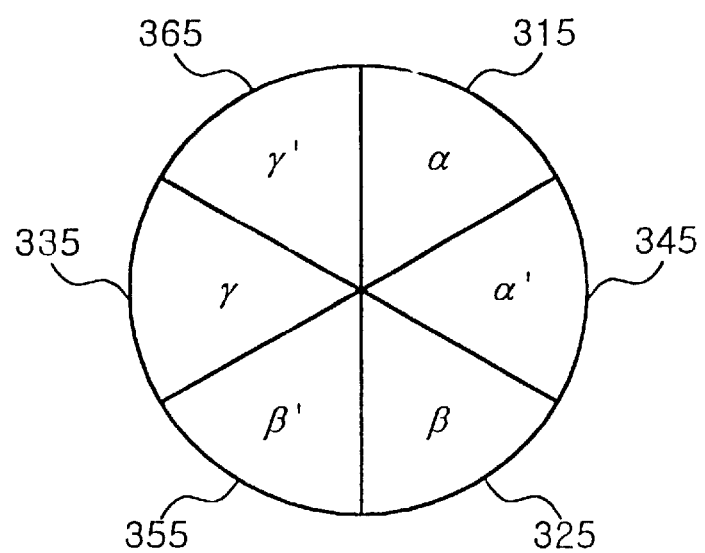

FIG. 3a shows the second preferred embodiment of the apparatus for multi-sectorizing a cell according to the present invention; and FIG. 3b shows the corresponding service coverage area. As illustrated, the apparatus includes a first BTS having a first antenna 310, a second antenna 320, and a third antenna 330, and a second BTS having a fourth antenna 340, a fifth antenna 350, and a sixth antenna 360.

The first antenna 310 serves sector α 315, the second antenna 320 serves sector β 325, and the third antenna 330 serves sector γ 335. The fourth antenna 340 serves sector α' 345, the fifth antenna 350 serves sector β' 355, and the sixth antenna 360 serves sector γ' 365. The antennas 310, 320, 330, 340, 350, 360 are 45° to 60° directional antennas and each antenna of the first BTS 310, 320, 330 is separated by 120° with respect to each other. Each antenna of the second BTS 340, 350, 360 is also separated by 120° with respect to each other. The first and second BTSs are separated by 60° with respect to each other to make it possible for the soft handoff to occur between each of sectors.

The second preferred embodiment of the present invention structured as stated above and illustrated by FIGS. 3a and 3b does not allow the occurrence of a softer handoff, i.e., a handoff between two sectors in the same BTS. For example, in FIG. 3b it is shown that the sectors of the first BTS and the sectors of the second BTS are not adjacent to each other and accordingly, a softer handoff cannot occur.

Figure 4A:
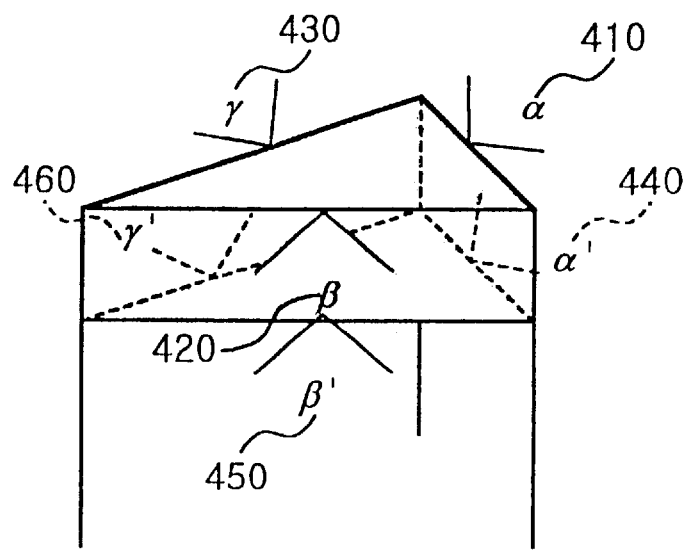
FIG. 4a is a diagram illustrating a third embodiment of an apparatus for multi-sectorizing a cell according to the present invention.
Figure 4B:
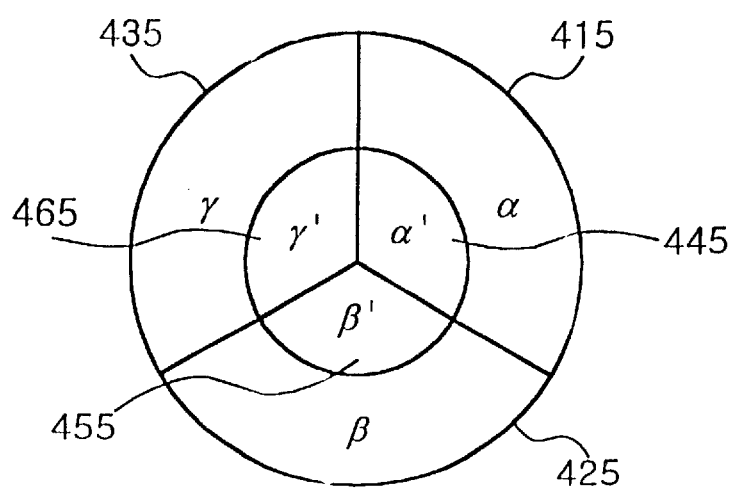

FIG. 4a shows the third preferred embodiment of the apparatus for multi-sectorizing a cell according to the present invention; and FIG. 4b shows the corresponding service coverage area. As illustrated the apparatus includes a first BTS having a first antenna 410, a second antenna 420, and a third antenna 430, and a second BTS having a fourth antenna 440, a fifth antenna 450, and a sixth antenna 460.

The first antenna 410 serves sector α 415, the second antenna 420 serves sector β 425, and the third antenna 430 serves sector γ 435. The fourth antenna 440 serves sector α' 445, the fifth antenna 450 serves sector β' 455, and the sixth antenna 460 serves sector γ' 465. The antennas 410, 420, 430, 440, 450, 460 are 95° to 120° directional antennas. The antenna directions of the two BTS are identical.

Figure 1A:
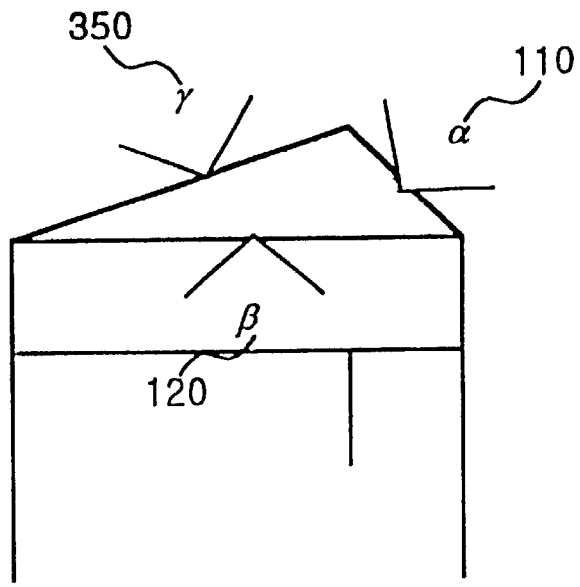
FIG. 1a is a diagram illustrating the structural configuration of a three-sector base transceiver station according to the prior art.

The first BTS is configured such that the antennas are established similar to the conventional method, as shown by FIG. 1a, based on the configuration of a macro-cell. The second BTS is configured as a micro-cell to accommodate subscribers of a neighboring coverage area. That is, the height of the antennas 440, 450, 460 along a vertical axis of the second BTS is lower than that of the antennas 410, 420, 430 of the first BTS, or the angle of tilt of the antennas of the second BTS is arranged in order for the service coverage areas 415, 425, 435 of the first BTS to be wider than the service coverage areas 445, 455, 465 of the second BTS.

Figure 5:
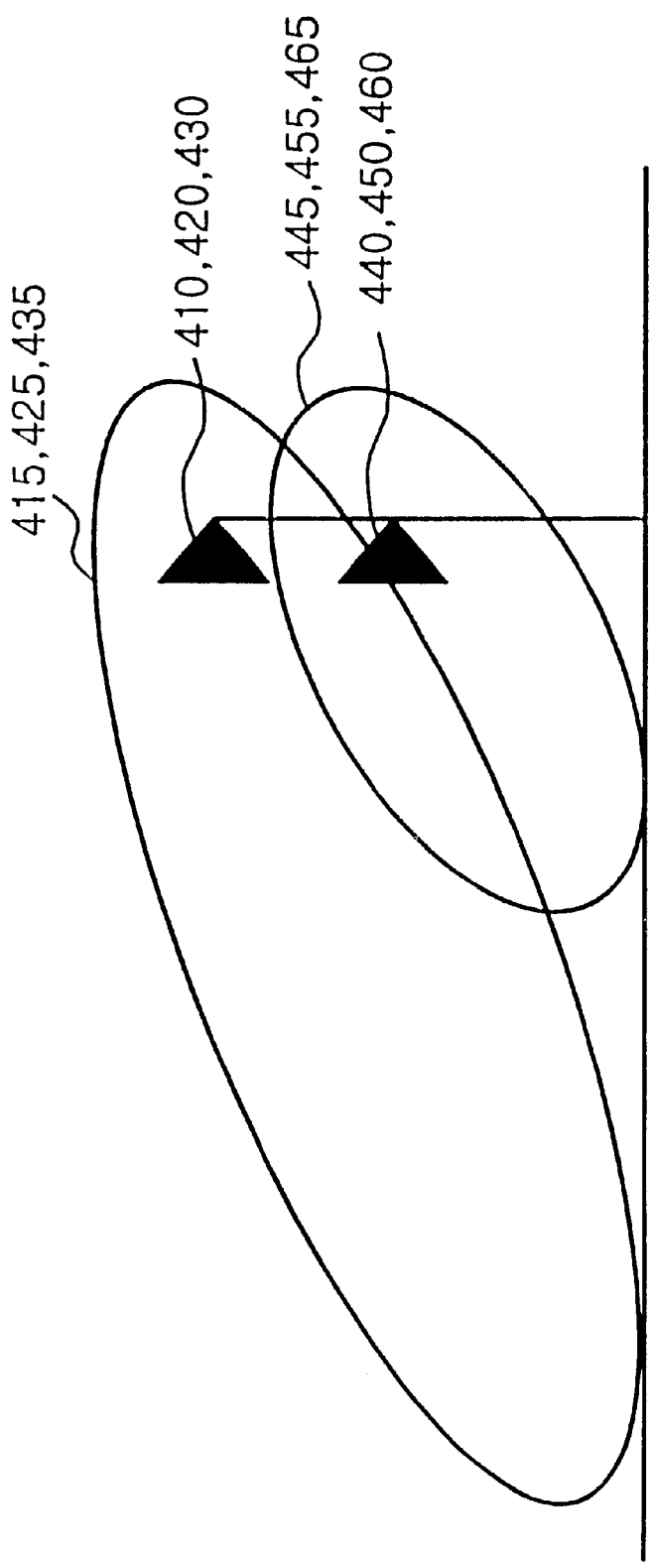
FIG. 5 is a diagram illustrating a profile of an antenna configuration of the third embodiment and corresponding coverage areas.

FIG. 5 illustrates a profile of an antenna configuration of the third embodiment and corresponding coverage areas. As illustrated, the antennas 410, 420, 430 of the first BTS are located higher along the vertical axis than the antennas 440, 450, 460 of the second BTS, thereby separating the service coverage areas.

Figure 1B:
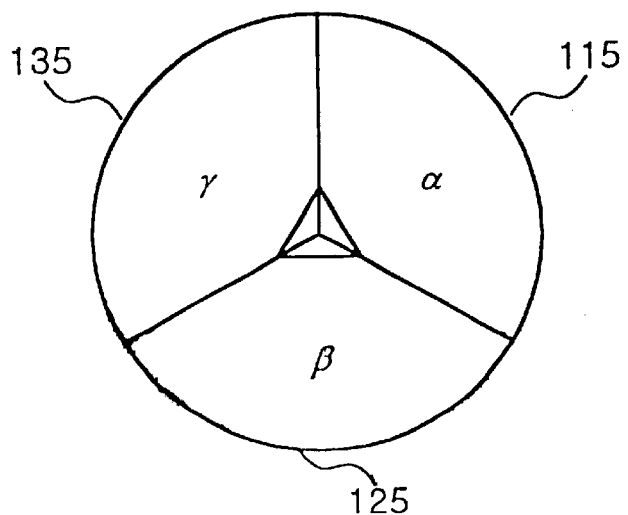

The third preferred embodiment having a structure as described above is able to serve by dividing the service coverage area of the cell into six coverage areas. That is, a short distance area is configured with sector α' 445, sector β' 455, and sector γ' 465, and a long distance area is configured with sector α 415, sector β 425, and sector γ 435. The apparatus has a lower sectorization gain than the three-sector BTS of the prior art illustrated by FIGS. 1a and 1b. However the apparatus of the present invention makes it possible to accommodate more subscribers in the overall mobile communication system.

The six-sector structure according to the present invention from the first embodiment to the third embodiment can obtain more effective sectorization gain.

The present invention provides the following advantages: First, it is possible to reduce the supplementary expenses of adding additional equipment to the mobile communication system by placing two BTSs at the same location or site, where each of the BTSs has three narrow beam directional antennas. Therefore, it is possible to perform system optimization without having to expand a cell.

Second, the present invention improves call quality and guarantees continuance of the call by making it possible to perform a soft handoff between the same frequency assignments, whereas in the prior art a hard handoff frequently occurs due to different frequency assignments between BTSs due to an imbalance in the distribution of subscribers in the communication system.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

What is claimed is:

1. A multi-sectorized base transceiver station system for increasing system capacity in a mobile communication system by sectorizing base transceiver stations covering a particular coverage area within a cell, said multi-sectorized base transceiver station system comprising:

a first base transceiver station having a first narrow beam directional antenna, a second narrow beam directional antenna, and a third narrow beam directional antenna, where said first, second, and third antennas serve first, second, and third sector areas of said particular coverage area, respectively, and where said first, second, and third antennas are separated by 60° with respect to each other; and a second base transceiver station having a fourth narrow beam directional antenna, a fifth narrow beam directional antenna, and a sixth narrow beam directional antenna, where said fourth, fifth, and sixth antennas serve fourth, fifth, and sixth sector areas of said particular coverage area, respectively, where said fourth, fifth, and sixth antennas are separated by 60° with respect to each other, said first base transceiver station and said second base transceiver station are separated by 180° with respect to each other, and where none of the sector areas overlap.

2. The system as set forth in claim 1, wherein said first antenna to said sixth antenna have a beamwidth of 45° to 60°.

3. The system as set forth in claim 1, wherein said first antenna and said second antenna have structure of a base transceiver station for an omni-cell.

4. The system as set forth in claim 2, wherein said first antenna and said second antenna have structure of base transceiver station for a three-sector cell.

5. The system as set forth in claim 1, wherein said first base transceiver station and said second base transceiver station are located at a site using a single antenna pole for both base transceiver stations.

6. A multi-sectorized base transceiver station system for increasing system capacity in a mobile communication system by sectorizing base transceiver stations covering a particular coverage area within a cell, said multi-sectorized base transceiver station comprising:

a first base transceiver station having a first narrow beam directional antenna, a second narrow beam directional antenna, and a third narrow beam directional antenna, where said first, second, and third antennas serve first, second, and third sector areas of said particular coverage area, respectively, and where said first, second, and third antennas are separated by 120° with respect to each other; and a second base transceiver station having a fourth narrow beam directional antenna, a fifth narrow beam directional antenna, and a sixth narrow beam directional antenna, where said fourth, fifth, and sixth antennas are separated by 120° with respect to each other, where said first base transceiver station and said second base transceiver station serve fourth, fifth, and sixth sector areas of said particular coverage area, respectively, where said fourth, fifth, and sixth antennas are separated by 60° with respect to each other, and where none of the sector areas overlap.

7. The system as set forth in claim 6, wherein said first antenna to said sixth antenna have a beamwidth of 45° to 60°.

8. The system as set forth in claim 6, wherein said first antenna and said second antenna have a structure of a base transceiver station for an omni-cell.

9. The system as set forth in claim 7, wherein said first antenna and said second antenna have structure of a base transceiver station for a three-sector cell.

10. The system as set forth in claim 6, wherein said first base transceiver station and said second base transceiver station are located at a site using a single antenna pole for both base transceiver stations.

11. A multi-sectorized base transceiver station system for increasing system capacity in a mobile communication system by sectorizing base transceiver stations covering a particular coverage area within a cell, said multi-sectorized base transceiver station comprising:

a first base transceiver station having a first narrow beam directional antenna, a second narrow beam directional antenna, and a third narrow beam directional antenna, where said first, second, and third antennas are separated by 120° with respect to each other; and a second base transceiver station having a fourth narrow beam directional antenna, a fifth narrow beam directional antenna, and a sixth narrow beam directional antenna, where said fourth, fifth, and sixth antennas are separated by 120° with respect to each other, where said first and second base transceiver stations are located on a site by equalizing a direction of propagation of said antennas of said first and second base transceiver stations, and where said first and second base transceiver stations are configured to have a different non-overlapping area of coverage with respect to each other.

12. The system as set forth in claim 11, wherein said fourth antenna to said sixth antenna are lower along a vertical axis with respect to said first antenna to said third antenna.

13. The system as set forth in claim 11, wherein said fourth antenna to said sixth antenna have a greater tilt than said first antenna to said third antenna such that an area of coverage of said first base transceiver station is greater than an area of coverage of said second base transceiver station.

14. The system as set forth in claim 11, wherein said first antenna to said sixth antenna have a beamwidth of 95° to 120°.

15. The system as set forth in claim 11, wherein said first base transceiver station serves a long distance area of the particular coverage area and said second base transceiver station serves a short distance area of the particular coverage area.

16. The system as set forth in claim 11, wherein said first antenna and said second antenna have a structure of a base transceiver station for an omni-cell.

17. The system as set forth in claim 16, wherein said first antenna and said second antenna have structure of a base transceiver station for a three-sector cell.

18. The system as set forth in claim 11, wherein said first base transceiver station and said second base transceiver station are located at a site using a single antenna pole for both base transceiver stations.

* * * * *